(12) United States Patent
Lee et al.

(10) Patent No.: US 8,898,151 B2
(45) Date of Patent: Nov. 25, 2014

(54) SYSTEM AND METHOD FOR FILTERING DOCUMENTS

(75) Inventors: Hyun Chul Lee, Thornhill (CA); Darius Braziunas, Toronto (CA); Michael Cvet, San Francisco, CA (US)

(73) Assignee: Rogers Communications Inc., Toronto, Ontario (CA)

( * ) Notice: Subject to any disclaimer, the term of this patent is extended or adjusted under 35 U.S.C. 154(b) by 472 days.

(21) Appl. No.: 13/253,209

(22) Filed: Oct. 5, 2011

(65) Prior Publication Data

US 2012/0330938 A1 Dec. 27, 2012

Related U.S. Application Data

(60) Provisional application No. 61/500,112, filed on Jun. 22, 2011.

(51) Int. Cl.
*G06F 17/30* (2006.01)

(52) U.S. Cl.
CPC .............................. *G06F 17/30867* (2013.01)
USPC ....................................................... 707/723

(58) Field of Classification Search
CPC .................................................. G06F 17/30864
USPC ....................................................... 707/723
See application file for complete search history.

(56) References Cited

U.S. PATENT DOCUMENTS

| | | | | |
|---|---|---|---|---|
| 7,853,599 | B2 * | 12/2010 | Liu et al. ....................... | 707/748 |
| 8,196,074 | B2 * | 6/2012 | Fredrickson et al. ......... | 716/100 |
| 8,316,029 | B2 * | 11/2012 | Lawrence ..................... | 707/748 |
| 2009/0006382 | A1 | 1/2009 | Tunkelang et al. | |
| 2010/0257184 | A1 | 10/2010 | Uy | |

OTHER PUBLICATIONS

Agichtein et al, Finding High-Quality Content in Social Media, 2008.*
Baris Guc's Master's Thesis, Information Filtering on Micro-blogging Services, Aug. 2010.*
Phuvipadawat et al, Breaking News Detection and Tracking in Twitter, 2010 IEEE/WIC/ACM.*
Metzler et al, Similarity Measures for Short Segments of Text, 2007, in ECIR, 16-27.*
International Search Reported dated Mar. 2, 2012, PCT/CA2010/050629.
Bruglieri et al., Cardinality Constrained Minimum Cut Problems: Complexity and Algorithms, Discrete Applied Mathematics 137 (2004) 311-341 ElsevierMathematics.com, Mar. 27, 2002, Milano, Italy.
Kleinberg et al., Approximation Algorithms for Classification Problems with Pairwise Relationships: Metric Labeling and Markov Random Fields, Journal of the ACM vol. 49, No. 5, Sep. 2002, pp. 616-639, Cornell University, Ithaca, New York.
Naor et al., Balanced Metric Labeling [Extended Abstract], Computer Science Department, Haifa, Israel. May 22-24, 2005, Baltimore, Maryland USA.

* cited by examiner

*Primary Examiner* — Rehana Perveen
*Assistant Examiner* — Loc Tran
(74) *Attorney, Agent, or Firm* — Rowand LLP

(57) ABSTRACT

A method and document separation system for separating a set of related documents is described. In one aspect, the method comprises: determining, on a document selection system, quality scores for a plurality of the documents in the set of related documents; obtaining a similarity score for a plurality of pairs of documents in the set of related document; and on a document selection system, obtaining a first subset of related documents which solves an optimization problem, the first subset of related documents including a portion of the document in the set of related documents, the optimization problem being a function of one or more quality scores of the documents assigned to the first subset of related documents and one or more similarity scores of pairs of documents assigned to the first subset of related documents.

30 Claims, 5 Drawing Sheets

SYSTEM AND METHOD FOR FILTERING DOCUMENTS

CROSS-REFERENCE TO RELATED APPLICATION

This application claims the benefit of and priority to U.S. Provisional Patent Application No. 61/500,112 filed Jun. 22, 2011 under the title SYSTEM AND METHOD FOR FILTERING AND RANKING DIGITAL CONTENT.

The content of the above patent application is hereby expressly incorporated by reference into the detailed description hereof.

TECHNICAL FIELD

The present disclosure relates generally to document selection. More specifically, it relates to methods and systems for automatically separating a set of related documents.

BACKGROUND

Traditional media sources such as newspaper, television and radio now coexist with non-traditional media sources, such as micro-blogs including Twitter™. The abundance of media sources and content produced by various media sources may be overwhelming to a user. That is, users may find it difficult to sort through such a large volume of documents.

The volume of documents may be particularly large for non-traditional media sources, such as micro-blogs. Since micro-blogs provide a means for laypeople to publish comments, the number of documents which are published on a micro-blog provider system (such as Twitter™) may be extremely large. That is, the large number of potential authors can result in a large number of documents being produced.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

In one aspect, the present disclosure provides a method of separating a set of related documents. The method comprises: determining, on a document selection system, quality scores for a plurality of the documents in the set of related documents; obtaining a similarity score for a plurality of pairs of documents in the set of related document; and on a document selection system, obtaining a first subset of related documents which solves an optimization problem, the first subset of related documents being a subset of the set of related documents, the optimization problem being a function of one or more quality scores of the documents assigned to the first subset of related documents and one or more similarity scores of pairs of documents assigned to the first subset of related documents.

In a further aspect, the present disclosure describes a document separation system. The document separation system includes a processor and a memory coupled to the processor. The memory stores processor executable instructions which, when executed by the processor cause the processor to: determine quality scores for a plurality of the documents in the set of related documents; obtain a similarity score for a plurality of pairs of documents in the set of related document; and obtain a first subset of related documents which solves an optimization problem, the first subset of related documents being a subset of the set of related documents, the optimization problem being a function of one or more quality scores of the documents assigned to the first subset of related documents and one or more similarity scores of pairs of documents assigned to the first subset of related documents.

Other aspects and features of the present application will become apparent to those ordinarily skilled in the art upon review of the following description of specific embodiments of the application in conjunction with the accompanying figures.

Sample Operating Environment

Figure 1:
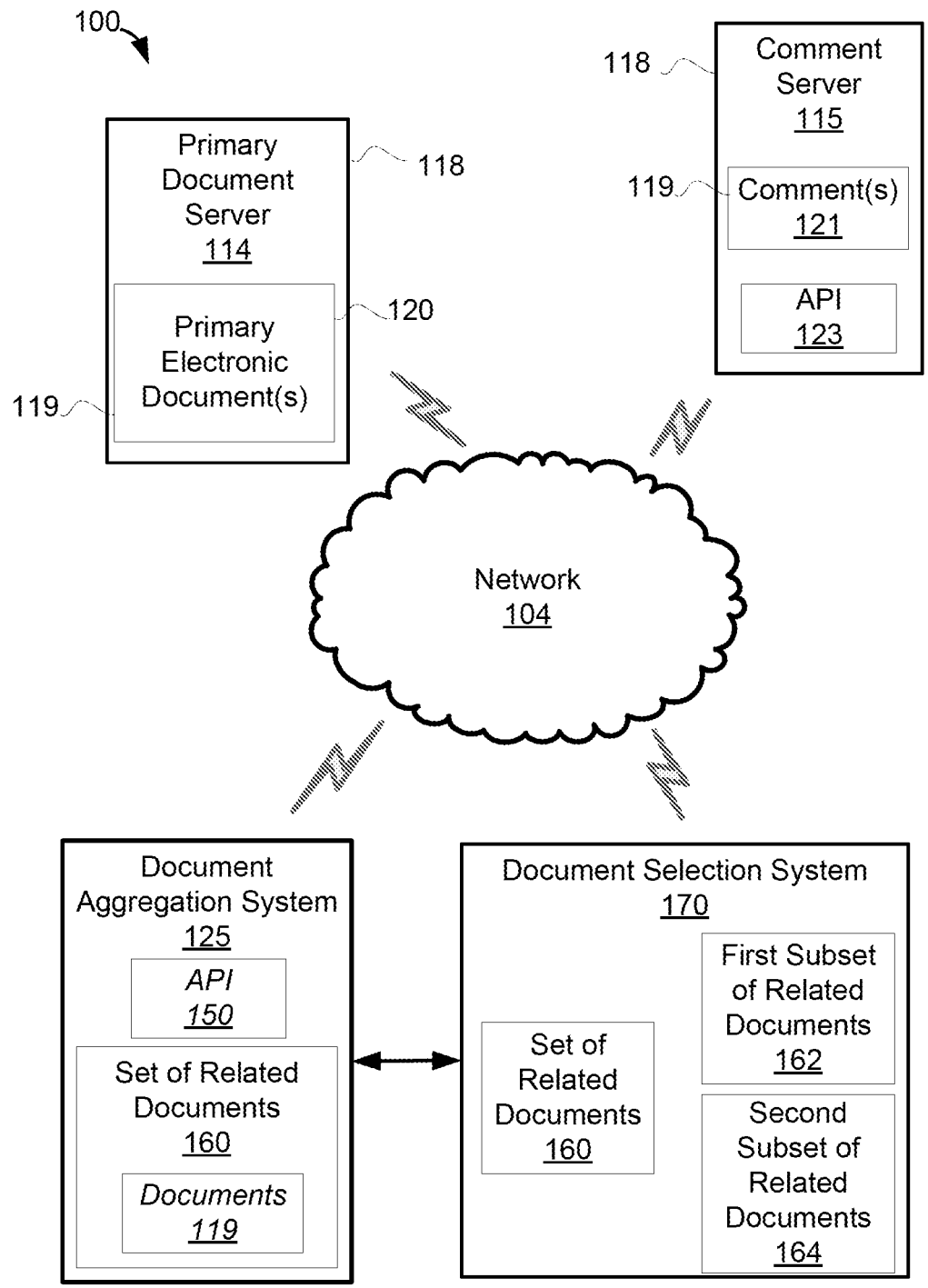
FIG. 1 shows a system diagram illustrating a possible environment in which embodiments of the present application may operate.

Reference is first made to FIG. 1, which illustrates a system diagram of a possible operating environment 100 in which embodiments of the present disclosure may operate.

In the embodiment of FIG. 1, a document aggregation system 125 is configured to obtain a set of related documents 160. The set of documents 160 includes a plurality of documents 119 which are determined, by the document aggregation system 125, to be related. The documents 119 may be documents which are associated with one or more document servers 118. In at least some embodiments, the documents 119 include one or more primary electronic documents 120 which may be stored on a primary document server 114 and/or one or more comments 121 which may be stored on a comment server 115.

In at least some embodiments, the document aggregation 125 is configured to analyze at least a portion of one or more machine readable documents, such as primary electronic documents 120, and to find comments 121 which are related to the primary electronic documents 120. The document aggregation system 125 may associate one or more primary electronic documents 120 with comments 121 which are related to those primary electronic documents 120. Accordingly, in at least some such embodiments, the set of related documents 160 may be a set of related comments 121.

In at least some embodiments, the primary electronic documents 120 may be stored on one or more primary document server 114. The primary document server 114 may be connected to the document aggregation system 125 via a network 104, such as the Internet. In some embodiments, the primary document server 114 may be a publicly and/or privately accessible web-site which may be identified by a unique Uniform Resource Locator ("URL").

The network 104 may be a public or private network, or a combination thereof. The network 104 may be comprised of a Wireless Wide Area Network (WWAN), a Wireless Local Area Network (WLAN), the Internet, a Local Area Network (LAN), or any combination of these network types. Other types of networks are also possible and are contemplated by the present disclosure.

The primary electronic documents 120 may, for example, be news-related documents such as one or more article or story. The news-related documents may contain information about recent and/or important events. In at least some embodiments, the primary document server 114 is operated by a news organization such as a newspaper. Where the primary electronic documents 120 are new-related documents, the document aggregation system 125 may be configured to find comments 121 which are related to the same story as one or more of the primary electronic documents 120. For example, where the story relates to an event, the document aggregation system 125 may be configured to locate comments 121 which are related to the same event. These comments 121 which are all determined by the document aggregation system to be related may form the set of related documents 160 illustrated in FIG. 1. Where the documents 119 which are aggregated by the document aggregation system 125 are news-related documents, the document aggregation system 125 may be referred to as a news aggregation system.

The primary electronic documents 120 (and/or the comments 121) may be text-based documents. That is, the primary electronic documents 120 may contain data in written form. By way of example and not limitation, the primary electronic documents 120 (and/or the comments 121) may be formatted in a Hyper-Text Markup Language ("HTML") format, a plain-text format, a portable document format ("PDF"), or in any other format which is capable of representing text or other content. Other document formats are also possible.

In at least some embodiments, the primary electronic documents 120 (and/or the comments 121) are not text-based documents. Instead, the primary electronic documents 120 (and/or the comments 121) may be documents which are capable of being converted to text based documents. Such documents may include, for example, video or audio files. In such embodiments, the document aggregation system 125, or another system, may include a text extraction module which is configured to convert audible speech into written text. Such text may then be analyzed in order to associate the primary electronic documents 120 with comments 121.

The comments 121 may, in various embodiments, be one or more of micro-blog posts, such as Twitter™ posts, social networking posts including status updates, such as Facebook™ posts and updates and/or Google™ Buzz™ posts and updates, user-generated comments from web-pages such as, for example, Youtube™ comments, etc. Other types of comments 121 may also be used.

The comments 121 are, in at least some example embodiments, restricted length posts. That is, the comments may be short text-based posts. In at least some embodiments, the comments 121 are less than one thousand (1000) characters. In at least some embodiments, (such as embodiments where the micro-blog posts are Twitter™ posts), the comments 121 may be up to one hundred and forty (140) characters.

In at least some embodiments, the comments 121 may be stored on one or more comment server 115. The comment server 115 may be accessible through a network 104, such as the Internet. In some embodiments, the comment server 115 may be a publicly and/or privately accessible web-site which may be identified by a unique Uniform Resource Locator ("URL"). The comment server 115 may receive the comments 121 from one or more users and may store such comments in a local or remote storage associated with the comment server 115. In at least some embodiments, the comment server 115 may be operated or controlled by a comment service provider. The comment service provider may, for example, be Twitter™ (e.g. where the comments 121 are Twitter™ posts), Google™ (e.g. where the comments 121 are Google™ Buzz™ posts), Facebook™ (e.g. where the comments 121 are Facebook™ posts), Youtube™ (e.g. where the comments 121 are Youtube™ posts). In other embodiments, the comment service provider may be another service provider not specifically listed above.

In at least some embodiments, the comment server 115 may include a comment application programming interface (API) 123. The comment API 123 may be configured to provide comments 121 associated with the comment server 115 to other modules and/or systems, such as the document aggregation system 125. In at least some embodiments, the comment API 123 may be configured to receive a request for comments from the document aggregation system 125 (or another system) and, in response retrieve one or more comments 121 from storage and provide the retrieved comments 121 to the document aggregation system 125 (or other system from which a request was received).

While in some embodiments, the comment server 115 may be configured to return comments 121 to a system (such as the document aggregation system 125) in response to a request from that system, in other embodiments, the comment server 115 may provide comments 121 to a system (such as the document aggregation system 125) when other criteria is satisfied. For example, the comment server 115 may, in at least some embodiments, be configured to periodically provide comments to the document aggregation system 125. For example, the comment server 115 may periodically send to the document aggregation system 125 any comments which have been posted since the comment server 115 last sent comments to the document aggregation system 125. In at least some embodiments, the document aggregation system 125 may store at least some of the received comments 121 in local memory on the document aggregation system 125.

In at least some embodiments, the document aggregation system 125 may analyze at least a portion of one or more primary electronic documents 120 (such as primary electronic documents 120 received from a primary document server 114) and may identify comments 121 (such as the comments 121 received from the comment server 115) which are related to the same subject matter as the primary electronic documents 120.

In at least some embodiments, functions or features provided by the document aggregation system 125 (and/or a document selection system 170 which will be discussed in greater detail below) may be accessed by one or more other systems or subsystems via an application programming interface (API) 150 provided by the document aggregation system 125 (and/or the document selection system 170). The API 150 may, for example, receive function calls from other systems. The function calls may, for example, be received from a document server 118 which provides public or private access to one or more documents 119 via the network 104. In some embodiments, the document server 118 which issues function calls to the API 150 may be the primary document server 114. The document server 118 may, for example, be a news content server which allows computers which are connected to the network 104 to view news content, such as news articles, through an Internet browser. The document server 118 may, for example, be configured to send information regarding a primary electronic document 120 to the document aggregation system 125. The information regarding the primary electronic document 120 may, for example, be the complete primary document, a portion thereof (such as the title of the primary electronic document 120) and/or the location of the primary document (in which case the document aggregation system 125 and/or the comment association system 170 may be configured to retrieve the primary electronic document 120 or a portion thereof). The information regarding the primary document 120 may be provided as a parameter in the function call to the API 150.

The API 150 may be configured to return, to the system or subsystem from which the function call was received (e.g. the document server 118), one or more comments 121 (or identifying information regarding the location where such comments are located) which are determined by the comment association system 170 to be related to the primary electronic document 120. In at least some embodiments, a document server 118 which receives the comments 121 which are related to a primary electronic document 120 (or the identifying information regarding the location where the comments are located) may be configured to display at least some of the comments 121 in a display screen which also includes the primary electronic document 120, or a portion thereof. For example, the document server 118 may include both the primary electronic document 120 (or a portion thereof) and related comments 121 in a common webpage, which may be viewed on computers connected to the network 104.

In some embodiments, the document aggregation system 125 may be configured to retrieve documents 119 from a plurality of document servers 118 and to cluster such documents by related subject matter. While a single primary document server 114 and a single comment server 115 are illustrated in FIG. 1, in at least some embodiments, the document aggregation server 125 may cluster documents from a plurality of primary document servers 114 and/or a plurality of comment servers 115. For example, in some embodiments, the document aggregation system 125 is a new aggregation system which is configured to search for and group together news stories regarding a common event. Such news stories may be obtained by the news aggregation system from a plurality of primary document servers 114. For example, various news organizations may each operate their own primary document server 114. The news aggregation system may associate news documents from a plurality of primary document servers 114 with one another if those news documents are related to a common subject. In at least some embodiments, the document aggregation system may be of the type described in United States Publication Number 2011/0093464 A1 which was filed Aug. 17, 2010 and entitled "SYSTEM AND METHOD FOR GROUPING MULTIPLE STREAMS OF DATA," the contents of which are incorporated herein by reference.

The document aggregation system 125 may include a number of systems, functions, subsystems or modules apart from those specifically discussed herein. In at least some embodiments, the document aggregation system 125 also includes a web-interface subsystem (not shown) for automatically generating web pages which permit access to the primary electronic documents 120 on the primary document servers 114 and/or provide other information about the primary electronic documents 120. The other information may include a machine-generated summary of the contents of the primary electronic document 120, and a rank of the subject matter of the primary electronic document 120 as determined by a ranking system. The web pages which are generated by the web-interface subsystem may display documents in groups determined by the document aggregation system 125. In at least some embodiments, the document aggregation system 125 is configured to generate web pages which relate one or more primary electronic documents 120 to comments 121 which are determined by the document aggregation system 125 to be related to those primary electronic documents 120. For example, in some embodiments, the document aggregation system 125 is configured to generate web pages which include both information about one or more related primary electronic documents 120 and also information about comments 121 which are related to those primary electronic documents 120.

Accordingly, in some embodiments, the document aggregation system 125 may allow public access to a set of related documents 160. In some such embodiments, the document aggregation system 125 provides such access by generating web pages which are accessible through a network 104 such as the Internet. The web pages may visually represent the relationship of documents by subject matter. For example, the web pages may display related documents, portions of related documents and/or or links to related documents on a common web page to indicate that such documents are related. Such related documents, portions and/or links may be displayed in close proximity to one another to visually represent the fact that the documents are related to one another.

As noted above, in some embodiments, the document aggregation system 125 may provide related documents to other systems which requested related documents through an API 150. These other systems may then generate web pages which are accessible through a network 104, such as the Internet. The web pages generated by such other systems may be configured to visually represent the relationship of documents by subject matter. For example, the web pages may display related documents or portions of related documents and/or links to related documents on a comment web page to indicate that such documents are related.

Accordingly, some embodiments the document aggregation system 125 is configured to generate web pages which illustrate the fact that documents are related and in other embodiments the document aggregation system 125 merely aggregates related documents and provides another system with information regarding which documents are related to one another. In either case, in some embodiments, it may be necessary or desirable to limit the number of related documents which are provided. For example, the complete set of related documents 160 may include too many documents for display; for example, too many comments 121 such as micro blog posts may be included in the set of related documents 160.

In at least some embodiments, a document selection system 170 may be provided to limit the set of related documents 160. The document selection system 170 may be configured to separate a set of related documents 160 into a plurality of subsets of related documents 162, 164. The subsets of related documents 162, 164 include a first subset of related documents 162 and a second subset of related documents 164. The first subset of related documents 162 may selected by the document selection system 170 to include a predetermined number of documents. The first subset of related documents 162 is selected to include documents which are determined to be of good quality. The first subset of related documents 162 is also selected to include documents which are diverse. That is, the documents in the first subset of related documents are selected to have a low similarity to one another.

Accordingly, in at least some embodiments, the document selection system 170 is configured to take, as an input, a set of related documents 160. In at least some embodiments, the set of related documents 160 includes only documents of a certain type (such as micro-blog posts). For example, the document aggregation system 125 may determine that too many micro-blog posts (such as Tweets) are contained in a group of related documents. The document aggregation system 125 may then provide the micro-blog posts to the document selection system so that the document selection system 170 may reduce the number of micro-blog posts to a more desirable level. In at least some embodiments, the document selection system 170 takes the set of input documents (such as the set of related documents 160) and divides the documents in that input set into one or more subsets. The subsets may include, for example, a first subset of related documents 162 which includes related documents which are of high quality and which are diverse. The documents in the first subset of related documents 162 may, for example, be displayed by the document aggregation system 125 in a web page of the type discussed above (i.e. a web page which is configured to display related documents). Alternatively, in some embodiments, the documents in the first subset of related documents 162 may be provided to another system which requested related documents via the API 150.

In at least some embodiments, the document selection system 170 may also produce a second subset of related documents 164. The second subset of related documents 164 may include a group of documents which are collectively of less quality and/or less diverse than the documents in the first subset of related documents 162. In some embodiments, the second subset of related documents 164 may be discarded. In other embodiments, the second subset of related documents may be used if certain criterion is satisfied. For example, in at least some embodiments, access to the documents in the second subset of related documents 164 is only provided within a web page (which may be generated by the document aggregation system 125 and/or a document server 118) if a request for more documents is received from a user. For example, the document aggregation system 125 (or another system) may be configured to generate a web-page which provides direct access to the documents in the first subset of related documents 162. Such access may be provided by displaying the documents in the first subset of related documents 162 or a portion thereof or by displaying links to such documents. In some embodiments, the web-page may also include an interface element (such as a selectable icon or text) which specifies that more documents are available for access. When a user selects this interface element, the access to the second subset of related documents 164 may be provided. For example, a web page may be displayed which displays or lists the documents in the second subset of related documents 164.

The document selection system 170 and/or the document aggregation system 125 may in various embodiments, include more or less subsystems and/or functions than are discussed herein. It will also be appreciated that the functions provided by any set of systems or subsystems may be provided by a single system and that these functions are not, necessarily, logically or physically separated into different subsystems. For example, in at least some embodiments, the document selection system 170 and the document aggregation system 125 may be a single system which provides both document aggregation capabilities and also document selection capabilities. Such a system may be referred to as a document selection system 170 or a document aggregation system 125 since both document selection capabilities and document aggregation capabilities are provided.

Accordingly, the term document selection system 170 as used herein includes standalone document selection systems which are not, necessarily, part of a larger system, and also document selection systems 170 which are part of a larger system or which include other systems or subsystems. The term document selection system 170, therefore, includes any systems in which the document selection methods described herein are included.

Furthermore, while FIG. 1 illustrates one possible operating environment 100 in which the document selection system 170 may operate, it will be appreciated that the document selection system 170 may be employed in any system in which it may be useful to reduce the number of documents in a set.

Example Comment Association System

Figure 2:
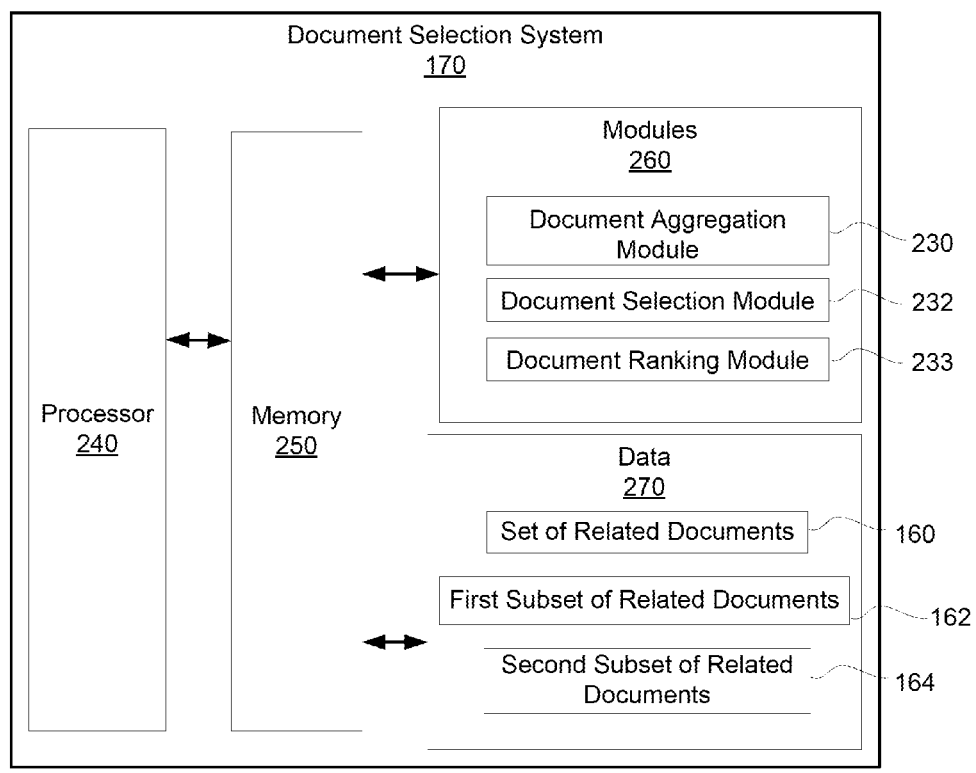
FIG. 2 shows a block diagram of a document selection system in accordance with an embodiment of the present disclosure.

Referring now to FIG. 2, a block diagram of an example document selection system 170 is illustrated. The document selection system 170 includes a controller, comprising one or more processor 240 which controls the overall operation of the document selection system 170.

The document selection system 170 includes a memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), a Solid State Drive (SSD), Flash Memory, or other types of memory. It will be appreciated that each of the various memory types will be best suited for different purposes and applications.

The processor 240 may operate under stored program control and may execute software modules 260 stored on the memory 250. In at least some embodiments, the document selection system 170 also functions as a document aggregation system 170. In such embodiments, the modules 260 may include a document aggregation module 230 which is configured to perform the functions of the document aggregation system 170. The functions of the document aggregation system 170 are referred to above. In at least some embodiments, the document aggregation module 230 is configured to obtain a set of related documents 160. The set of related documents 160 may, for example, include a plurality of comments 121 (such as micro-blog posts) which are determined by the document aggregation module 230 to be related to one another. For example, the document aggregation module 230 may find a plurality of comments which are all related to the same subject matter as a primary electronic document 120.

Since the number of related documents in a set of related documents 160 may be large, in at least some embodiments, the document selection system 170 is configured to pare down the number of related documents. In at least some such embodiments, the document selection system 170 may include a document selection module 232. The document selection module 232 is configured to take a set of related documents 160 and to produce, from that set, a first subset of related documents 162. The first subset of related documents 162 includes fewer documents than the set of related documents 160. That is, the first subset of related documents 162 includes some but not all of the documents in the set of related documents 160. In at least some embodiments, the document selection module 232 is configured to also produce a second subset of related documents 164. The second subset of related documents 164 includes documents from the set of related documents 160 which were not included in the first subset of related documents 162.

The document selection module 232 will be discussed in greater detail below with reference to FIGS. 3 to 5.

In at least some embodiments, the document selection system 170 may include a document ranking module 233. The document ranking module 233 is configured to rank a plurality of documents based on predetermined ranking criteria. In some embodiments, the document ranking module 233 is configured to rank the documents in the first subset of related documents 162. In at least some embodiments, the document ranking module 233 is configured to sort the documents so that higher quality documents are ranked relatively higher than lower quality documents. In at least some embodiments, the ranks are used to determine how prominently a document will be displayed. For example, when the documents in the first subset of related documents 162 are displayed in a web page, they may be ordered according to their respective ranks. A document with a relatively higher rank may be displayed higher on a web page than a document with a relatively lower rank.

The set of related documents 160, the first subset of related documents 162 and/or the second subset of related documents 164 may, for example, be stored in a data 270 area of memory 250. The set of related documents 160, the first subset of related documents 162 and/or the second subset of related documents 164 identify related documents. In at least some embodiments, the set of related documents 160, the first subset of related documents 162 and/or the second subset of related documents 164 may include documents or portions thereof. That is, the documents themselves may be locally stored in the memory 250 of the document selection system 170. In other embodiments, the set of related documents 160, the first subset of related documents 162 and/or the second subset of related documents 164 may include a pointer or link specifying where such documents may be found. For example, in some embodiments, the documents in the set of related documents 160, the first subset of related documents 162 and/or the second subset of related documents 164 may be stored on a remote server such as the comment server 115 of FIG. 1 and the set of related documents 160, the first subset of related documents 162 and/or the second subset of related documents 164 may specify the location of documents (such as the location of the comments on the comment server 115).

The memory 250 may also store other data 270 not specifically referred to above.

The document selection system 170 may be comprised of other features, components, or subsystems apart from those specifically discussed herein. By way of example and not limitation, the document selection system 170 will include a power subsystem which interfaces with a power source, for providing electrical power to the document selection system 170 and its components. By way of further example, the document selection system 170 may include a display subsystem for interfacing with a display, such as a computer monitor and, in at least some embodiments, an input subsystem for interfacing with an input device. The input device may, for example, include an alphanumeric input device, such as a computer keyboard and/or a navigational input device, such as a mouse.

It will also be appreciated that the modules 260 may be logically or physically organized in a manner that is different from the manner illustrated in FIG. 2. By way of example, in some embodiments, two or more of the functions described with reference to two or more modules may be combined and provided by a single module. In other embodiments, functions which are described with reference to a single module may be provided by a plurality of modules. Thus, the modules 260 described with reference to FIG. 2 represent one possible assignment of features to software modules. However, such features may be organized in other ways in other embodiments.

Selecting and Ranking Related Documents

Figure 3:
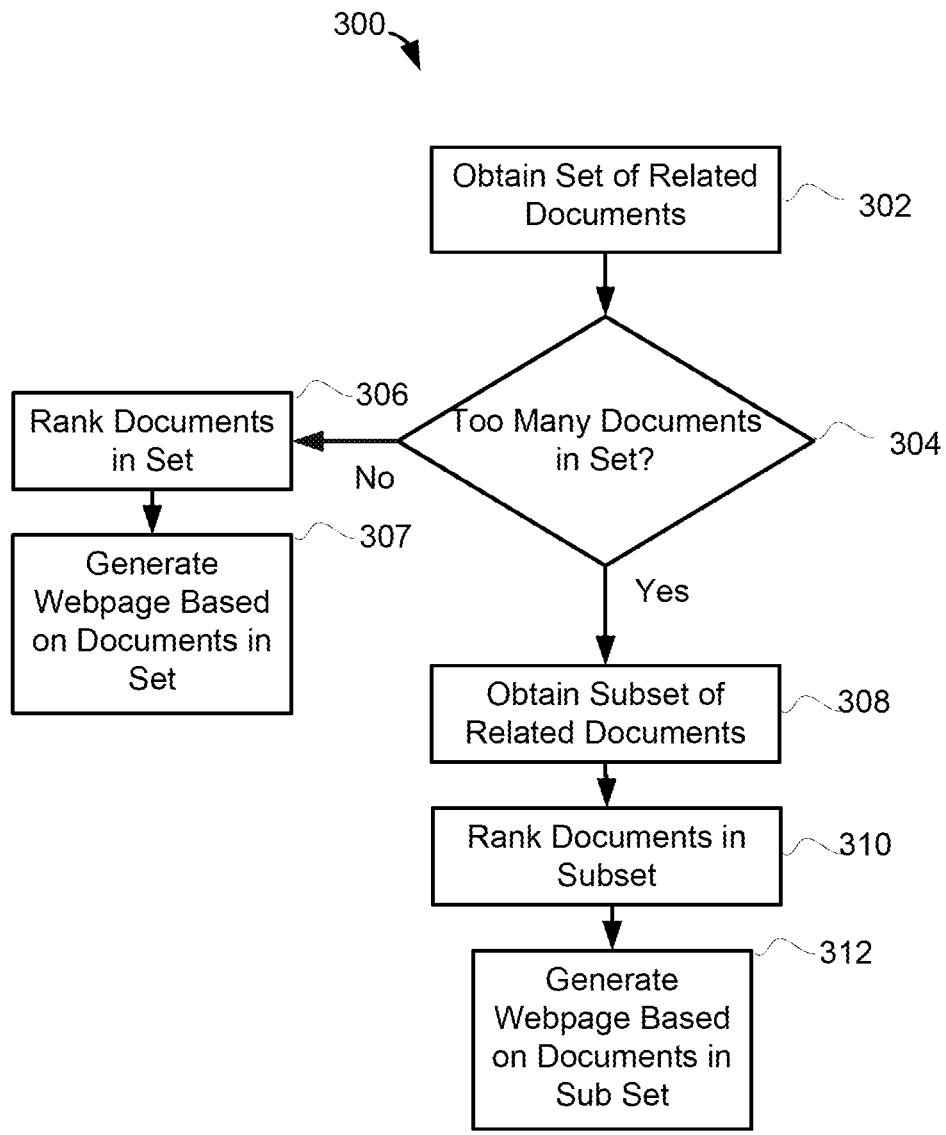
FIG. 3 is a flowchart of an example method for selecting and ranking a plurality of documents in accordance with an embodiment of the present disclosure.

Referring now to FIG. 3, a flowchart is illustrated of a method 300 for selecting and ranking a plurality of related documents.

The method 300 includes steps or operations which may be performed by the document selection system 170. In at least some embodiments, the document selection system 170 may include a memory 250 (or other computer readable storage medium) which stores computer executable instructions which are executable by one or more processor 240 and which, when executed, cause the processor to perform the method 300 or a portion thereof. In some example embodiments, these computer executable instructions may be contained in one or more module 260 such as, for example, the document aggregation module 230, the document selection module 232 and/or the document ranking module 233. That is, in at least some example embodiments, one or more of these modules 260 (or other software modules) may contain instructions for causing the processor 240 to perform the method 300 of FIG. 3.

The method 300 may include, at 302, obtaining a set of related documents 160. In at least some embodiments, at 302, the document selection system 170 identifies a group of documents which are related to one another. In at least some embodiments, the document selection system 170 identifies a group of documents which are all related to a common subject matter. In at least some embodiments, the document selection system 170 may analyze at least a portion of one or more primary electronic documents 120 (such as primary electronic documents 120 received from a primary document server 114) and may identify comments 121 (such as the comments from the comment server 115) which are related to the same subject matter as the primary electronic document(s) 120. The group of comments which are all related to the same subject matter as the primary electronic document(s) may form the set of related documents 160. In at least some embodiments, a document aggregation module 230 (FIG. 2) may be configured to cause a processor 240 to perform 302.

In some embodiments, after a set of related documents is obtained at 302, the document selection system 170 may determine (at 304) whether the set of related documents contains too many documents. This determination may be made by comparing the number of documents in the set of related documents 160 to a predetermined threshold. If the number of documents in the set does not exceed the threshold, then the document selection system 170 may rank the documents in the set of related documents 160 (at 306). In at least some embodiments, the document selection system 170 is configured to rank the documents in the set relative to one another based on the respective quality of the documents in the set.

The quality of a document may be numerically represented by one or more quality scores. A quality score of a document may, for example, be related to the size of that document. For example, the quality score of a document may be a function of the number of words and/or characters in that document. In some embodiments, a predetermined optimal size of a document may be specified. By way of example, in some embodiments the predetermined optimal size may be eighty (80) characters. In such embodiments, the document selection system 170 may determine the size of a document and may reduce the quality score for the document if the size of the document deviates from the predetermined optimal size.

In some embodiments, a quality score of a document may be related to the percentage of words in the document which are dictionary words. That is, the quality score for a document is determined based on the percentage of words in the document which are listed in a dictionary. In at least some embodiments, the document selection system 170 is configured to determine the percentage of words in the document which are listed in a dictionary by comparing the words in the document with a predetermined dictionary. The dictionary may, for example, be stored in memory 250 of the document selection system 170 and the dictionary may include a list of dictionary words. The dictionary may not include definitions for the words. That is, in at least some embodiments, the dictionary lists words which are considered dictionary words but may not provide a definition for these words.

In some embodiments, a quality score of a document may be related to the language quality of the document. In such embodiments, the document selection system 170 may be configured to determine the language quality of the document and to determine a quality score based on that language quality. To do so, the document selection system 170 may extract features of the document and correlate such features to language quality. For example, in some embodiments, the language quality of the document may be related to the diversity of the vocabulary used in the document. A more diverse vocabulary may improve the quality score for that document. In at least some embodiments, the language quality of a document may be related to the degree to which the document is compressible. A more compressible document will be assigned a poorer quality score than a less compressible document since the compressibility of the document may be correlated to language diversity. That is, if a document can be compressed to a large degree without losing information, then the document selection system 170 may determine that the document must have been of a low quality.

In at least some embodiments, a quality score of a document may be related to the number of subscribers associated with a content producer for that document. In some such embodiments, the quality score of a document may be related to the number of followers of the author of the document. For example, where the document is a micro-blog post such as a Twitter™ post, the quality score may be related to the number of users who are following the user who authored the micro-blog post. If the author has a relatively large number of followers, then the document selection system 170 may determine that the document is of higher quality than it would be if the author had a relatively small number of followers. The document selection system 170 may, in at least some embodiments, determine the number of followers of the author of the document using an application programming interface, such as the comment API 123 of FIG. 1. That is, the comment API 123 may provide the document selection system 170 with information which specifies the number of followers of the author of a comment. The document selection system 170 may then determine a quality score for one or more documents written by the author based on the number of followers of the author of the comment. Such a quality score may be referred to as a follower score.

In at least some embodiments, the document selection system 170 may be configured to determine a quality score for a document based on an approval rating of the document. The approval rating of the document may, in some embodiments, be a measure of the number of times the document has been shared. By way of example, in some embodiments, a document server 118, such as the comment server 115, is configured to allow users to share documents 119, such as comments 121. For example, a comment server 115 which allows users to post micro-blog posts (such as Tweets™) may allow users to re-post or otherwise share micro-blog posts (for example, by re-Tweeting™). For example, the comment server 115 may track the number of times a comment 121 has been shared and may provide this information to the document selection system 170 via the comment API 123. The document selection system 170 may use this received information to determine a quality score for the document.

In at least some embodiments, where a document server 118 allows documents to be re-posted, the document selection system 170 may be configured to determine a quality score for a document based on a re-post score for that document. The re-post score may, in at least some embodiments, be a measure of the number of times the document was re-posted. The document selection system 170 may receive information specifying the number of times a document 119 was re-posted via an API 123 such as the comment API 123 (FIG. 1) and also information specifying whether the document 119 is an original document or whether it is a re-posted document. If the document 119 is an original document, the document selection system 170 may assign that document 119 a better relative re-post score. For example, in at least some embodiments, if the document is an original document (i.e. an originally authored document and not simply a repost), the document selection system 170 may assign that document a re-post score of zero (0). If, however, the document is a re-posted document, then the document selection system 170 may assign that document a poorer relative re-post score. For example, in at least some embodiments, if the document is a re-posted document, then the document selection system 170 may assign the document a re-post score which is related to the number of times that the document has been re-posted.

In some embodiments, a predetermined re-post threshold may be specified. If the number of re-posts of the document is greater than the predetermined re-post threshold, then the re-post score may be assigned a poorer relative re-post score. For example, in at least some embodiments, if the number of re-posts of the document is greater than the predetermined re-post threshold, then the document selection system 170 may assign that document a repost score of one (1). In at least some embodiments, if the number of re-posts of the document is less than the predetermined re-post threshold and the document is not an original document (i.e. the document is a re-post), then the document selection system 170 may assign that document a re-post score which is better than if the number of re-posts exceeded the threshold, but which is worse than if the document was an original document. For example, in at least some embodiments, if the number of re-posts of the document is less than the predetermined repost threshold and the document is not an original document (i.e. the document is a re-post), then the document selection system 170 may assign that document a re-post score which is equal to the number of re-posts of that document divided by the predetermined re-post threshold.

In at least some embodiments, the document selection system 170 may be configured to determine a quality score for a document based on a relevance score for the document. In such embodiments, the document selection system 170 may be configured to determine how relevant a document is to a topic. The relevance score for a document could be determined, for example, based on the cosine similarity between vector representations of the document and the topic. The vector representations may, in at least some embodiments, be term-count representations. In at least some embodiments, the vector representations may be term frequency inverse document frequency (TF-IDF) representations.

Thus, in various embodiments, one or more quality scores for a document may be determined based on one or more of the metrics discussed above. In some embodiments, a combined quality score may be determined based on two or more of these metrics. For example, a combined quality score may be determined as a weighted sum of any two or more of the quality scores discussed above. Weights associated with any two or more of these quality scores may be predetermined.

Accordingly, in at least some embodiments, at 306, the document selection system 170 may be configured to rank the document in the set of related documents based on one or more of the quality scores (or combined quality scores) discussed above.

Next, at 307, the document selection system 170 may automatically generate one or more webpages based on the set of related documents obtained at 302. The one or more webpages visually represent the relationship of the set of related documents. That is, the one or more webpages visually represent the fact that the documents in the set of related documents are related to one another. In some embodiments an identifier of each document in the set of related documents may be displayed in a list of the webpage.

The one or more webpages may also visually represent the rankings determined at 306. For example, the webpages may display an identifier of a first document more prominently than an identifier of a second document if the first document has a higher relative rank than the second document. In at least some embodiments, each document in the set of related documents 160 may be displayed in a list of the webpage and the list may be ordered according to the ranks determined at 306.

In some embodiments, the webpages may be automatically generated by the document selection system 170. In other embodiments, the webpages may be generated by another system. For example, in at least some embodiments, the document selection system 170 may provide the set of related documents 160 to another system which requested related documents through at API 150 associated with the document selection system 170. That system may then generate the webpages described above.

If, at 304, the document selection system 170 determined that there are too many documents in the set of related documents obtained at 302 (i.e. if the set of related documents exceeds a threshold), then at 308, the document selection system 170 may obtain a subset of related documents. This subset of related document may be referred to as a first subset of related documents 162. The first subset of related documents 162 includes a portion of the documents in the set of related documents 160 obtained at 302. However, the first subset of related documents 162 obtained at 308 does not include all of the documents in the set of related documents 160.

The document selection system 170 obtains the first subset of related documents 162 by solving an optimization problem. The optimization problem is a function of one or more quality scores of the documents which are assigned to the first subset of related documents and one or more similarity scores of pairs of documents assigned to the first subset of related documents. Methods of obtaining the first subset of related documents 162 will be discussed in greater detail below with reference to FIGS. 4 to 5.

Next, at 310, the document selection system 170 ranks the documents in the first subset of related documents 162. In at least some embodiments, the document selection system 170 is configured to rank the documents in the first subset of related documents 162 relative to other documents in the first subset of related documents 162 based on the respective quality of the documents in the first subset of related documents 162. For example, as discussed above with reference to 306, the quality of a document may be numerically represented by one or more quality scores. Specific quality scores and methods of determining quality scores are discussed above with reference to 306. At 310, the document selection system 170 may rank the documents in the first subset of related documents 162 according to one or more quality scores assigned to those documents.

Next, at 312, the document selection system 170 may automatically generate one or more webpages based on the documents in the first subset of related documents 162. The one or more webpages visually represent the relationship of the first subset of related documents. That is, the one or more webpages visually represent the fact that the documents in the subset of related documents are related to one another. In some embodiments an identifier of each document in the subset of related documents may be displayed in a list of the webpage.

The one or more webpages may also visually represent the rankings determined at 310. For example, the webpages may display an identifier of a first document more prominently than an identifier of a second document if the first document has a higher relative rank than the second document. In at least some embodiments, each document in the subset of related documents may be displayed in a list of the webpage and the list may be ordered according to the ranks determined at 310.

In some embodiments, the webpages may be automatically generated by the document selection system 170. In other embodiments, the webpages may be generated by another system. For example, in at least some embodiments, the document selection system 170 may provide the subset of related documents 162 to another system which requested related documents through at API 150 associated with the document selection system 170. That system may then generate the webpages described above.

Obtaining Subset of Related Documents

Figure 4:
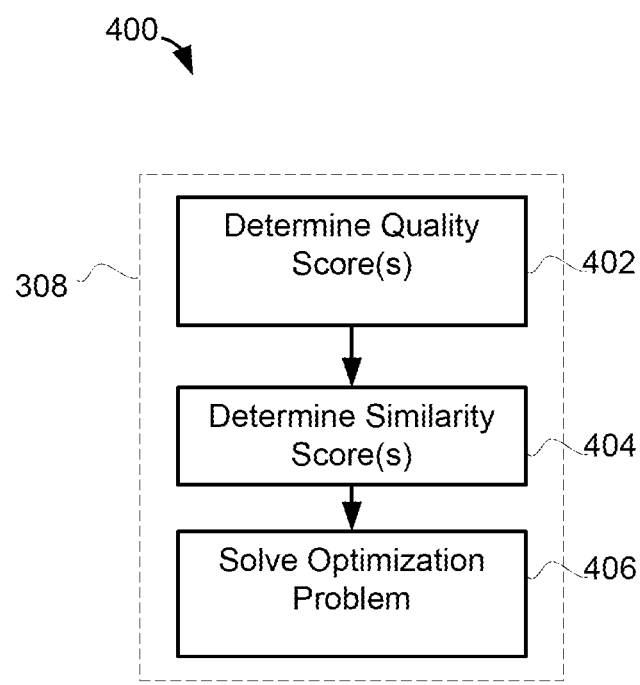
FIG. 4 is a flowchart of a method for separating a set of related documents in accordance with some example embodiments of the present disclosure.

Reference will now be made to FIG. 4, which illustrates a flowchart of a method 400 for separating a set of related documents in accordance with some example embodiments of the present disclosure. The method 400 may, in at least some embodiments, be performed at 308 of FIG. 3.

The method 400 includes steps or operations which may be performed by the document selection system 170. In at least some embodiments, the document selection system 170 may include a memory 250 (or other computer readable storage medium) which stores computer executable instructions which are executable by one or more processor 240 and which, when executed, cause the processor to perform the method 400 or a portion thereof. In at least some embodiments, a document selection module 232 may contain computer executable instructions for causing the processor 240 to perform the method 400 of FIG. 4.

At 402, in at least some embodiments, the document selection system 170 determines quality scores for a plurality of the documents in the set of related documents 160. In some embodiments, a single quality score is determined per document. In other embodiments, a plurality of quality scores is determined for each document. A quality score numerically represents the quality of a document. The quality score may be determined according to any one or more of the methods discussed above with reference to 306 of FIG. 3. For example, in at least some embodiments, a quality score may be determined based on any one or more of: the size of a document, the percentage of words in a document which are dictionary words, the language quality of a document, the number of subscribers associated with a content producer for a document, an approval rating of the document (such as the number of times the document has been shared), a relevance score for a document and/or a re-post score for a document. Other quality scores may also be used in other embodiments. In at least some embodiments, one or more quality scores are determined for each document in the set of related documents 160.

At 404, in at least some embodiments, a similarity score may be obtained by the document selection system 170 for a plurality of pairs of documents in the set of related documents. The similarity score may be determined for each possible pairing of documents in the set of related documents 160. The similarity score is a measure of the degree to which the documents in a pair of documents are similar. In at least some embodiments, the similarity score may be determined based on the number of terms which are common to both documents in the pair. For example, the document selection system 170 may determine the term overlap percentage in a pair of documents and may determine a similarity score for that pair of documents based on the term overlap percentage of terms in the documents.

In at least some embodiments, a similarly score for a pair of documents may be determined from the distance between term frequency inverse document frequency (TF-IDF) vector representations of documents in the pair of documents. The TF-IDF is a statistical measure which may be used to evaluate how important a word is to a document. It examines the frequency of occurrence of a term in the portion of the document relative to the frequency of that term in a larger set of documents. In at least some embodiments, the distance between the TF-IDF vector representations of documents may be determined as a cosine similarity between the TF-IDF vector representations of the documents. Cosine similarity is a measure of similarity between two vectors by measuring the cosine of the angle between them. The cosine of the angle between the two vectors determines whether the vectors are pointing in approximately the same direction.

In at least some embodiments, after the quality score(s) and similarity score(s) are determined, a first subset of related documents 162 may be obtained. The first subset of related documents 162 includes some, but not all, of the documents in the set of related documents 160.

The first subset of related documents 162 may be obtained by solving an optimization problem. The optimization problem is a function of the quality scores of the documents assigned to the first subset of related documents 162 and the similarity scores of all pairs of documents assigned to the first subset of related documents 162. That is, documents from the set of related documents 160 are selectively included in the first subset of related documents 162 in order to jointly maximize the quality of the documents in the first subset of related documents and the diversity of the documents in the first subset of related documents. That is, the document selection system 170 attempts to solve an optimization problem which seeks to maximize the quality of the documents in the first subset of related documents 162 while minimizing the similarity of the documents in the first subset of related documents 162.

In at least some embodiments, the first subset of related documents 162 is of a predetermined size. That is, the first subset of related documents 162 includes a predetermined number of documents.

In at least some embodiments, the optimization problem which is used to select documents for inclusion in the first subset of related documents 162 maximizes an evaluation function. In at least some embodiments, the evaluation function is:

$$f(A) = \sum_{v \in V} u_v(v, A(v)) + \sum_{v_1, v_2 \in E} u_E(v_1, v_2, A(v_1), A(v_2))$$

where v is a document, $A(v)$ is a labelling function which assigns a document, v, to either the first subset of related documents or a second subset of related documents, V is the set of related documents 160, $u_v(v, A(v))$ is a function of the quality score of a document v, E is a set of all pairs of documents and $u_E(v_1, v_2, A(v_1), A(v_2))$ is a function of the similarly score between document $v_1$ and $v_2$.

In at least some embodiments, if a document v is assigned to a first subset of related documents, the function $(u_v(v, A(v)))$ of the quality score of a document v may be based on a plurality of quality scores for a document. For example, in at least some embodiments, the function of the quality score may be based on a relevance score, $q(v)$, for the document, a re-post score, $r(v)$, for the document, and/or a follower score, $o(v)$, for the document. The relevance score, re-post score and/or follower score are all quality scores for a document and are discussed in greater detail above with reference to 306 of FIG. 3. It will be appreciated that, in other embodiments, the function $(u_v(v, A(v)))$ of the quality score of a document v may be based on other quality scores instead of or in addition to the re-post score, relevance score and/or follower score. In various embodiments, the function may be based on any one or combination of: the size of a document, the percentage of words in a document which are dictionary words, the language quality of a document, the number of subscribers associated with a content producer for a document, an approval rating of the document (such as the number of times the document has been shared), a relevance score for a document and/or a re-post score for a document. Other quality scores may also be used in other embodiments.

In at least some embodiments, the quality scores which are used in the function $(u_v(v, A(v)))$ of the quality score may be weighted. For example, in at least some embodiments, a weight may be assigned to each quality score. In at least some embodiments, two weights may be assigned to each quality score used in the function $(u_v(v, A(v)))$ of the quality score. One of the weights may be applied if the document is assigned to the first subset of related documents and another weight may be applied if the document is assigned to the second subset of related documents. The weights may be used to control the relative importance of various quality scores. Accordingly, in at least some embodiments the weights may include: a relevance score weight, $w_q^0$, for documents in the first subset of related documents, a relevance score weight, $w_q^1$, for documents in the second subset of related documents, a re-post score weight, $w_r^0$, for documents in the first subset of related documents, a re-post score weight, $w_r^1$ for documents in the second subset of related documents, a follower score weight, $w_o^0$, for documents in the first subset of related documents, and/or a follower score weight, $w_o^1$, for documents in the second subset of related documents.

In at least some embodiments the sum of the weights applied to quality scores for a document in the first subset of related document is one (1) and the sum of the weights applied to quality scores for a document in the second subset of related documents is also one (1). For example, in at least some embodiments, $w_q^0 + w_r^0 + w_o^0 = 1$ and $w_q^1 + w_r^1 + w_o^1 = 1$.

In at least some embodiments, one or more of the quality scores may be normalized. That is, a quality scores may be adjusted so that the maximum value for that quality score is one (1) and adjusted so that the minimum score is zero (0). For example, in at least some embodiments, the re-post score, r(v), is a normalized re-post score.

In at least some embodiments, if a document, v, is assigned to the first subset of related documents, then:

$$u_v(v,A(v)) = w_q^0 q(v) + w_r^0 (1-r(v)) + w_o^0 o(v),$$

Similarly, in at least some embodiments, if a document is assigned to the second subset of related documents, then:

$$u_v(v,A(v)) = w_q^1 q(v) + w_r^1 (r(v)) + w_o^1 o(v),$$

The equations may be designed to favour high-value original documents in the first subset and to bias documents with a high re-post score towards the second subset.

The function, $u_E(v_1, v_2, A(v_1), A(v_2))$, of the similarity score may, in at least some embodiments be designed to value pairs of documents which are diverse. That is, pairs of documents which have a low similarity scored may be preferred to pairs of documents having a higher relative similarity score.

In at least some embodiments, if a first document $v_1$ and a second document $v_2$ are assigned to the same subset then:

$$u_E(v_1, v_2, A(v_1), A(v_2)) = 1 - s(v_1, v_2),$$

In at least some embodiments, if the first document $v_1$ and the second document $v_2$ are assigned to different subsets then:

$$u_E(v_1, v_2, A(v_1), A(v_2)) = s(v_1, v_2),$$

where $s(v_1, v_2)$ is a similarity score for the pair of documents $v_1$ and $v_2$, and where $s(v_1, v_2) \in [0; 1]$.

The equations above attempt to minimize the similarity of documents within the first subset of related documents and to maximize the similarity of documents in different subsets.

Obtaining Subset of Related Documents Using Local Search

Figure 5:
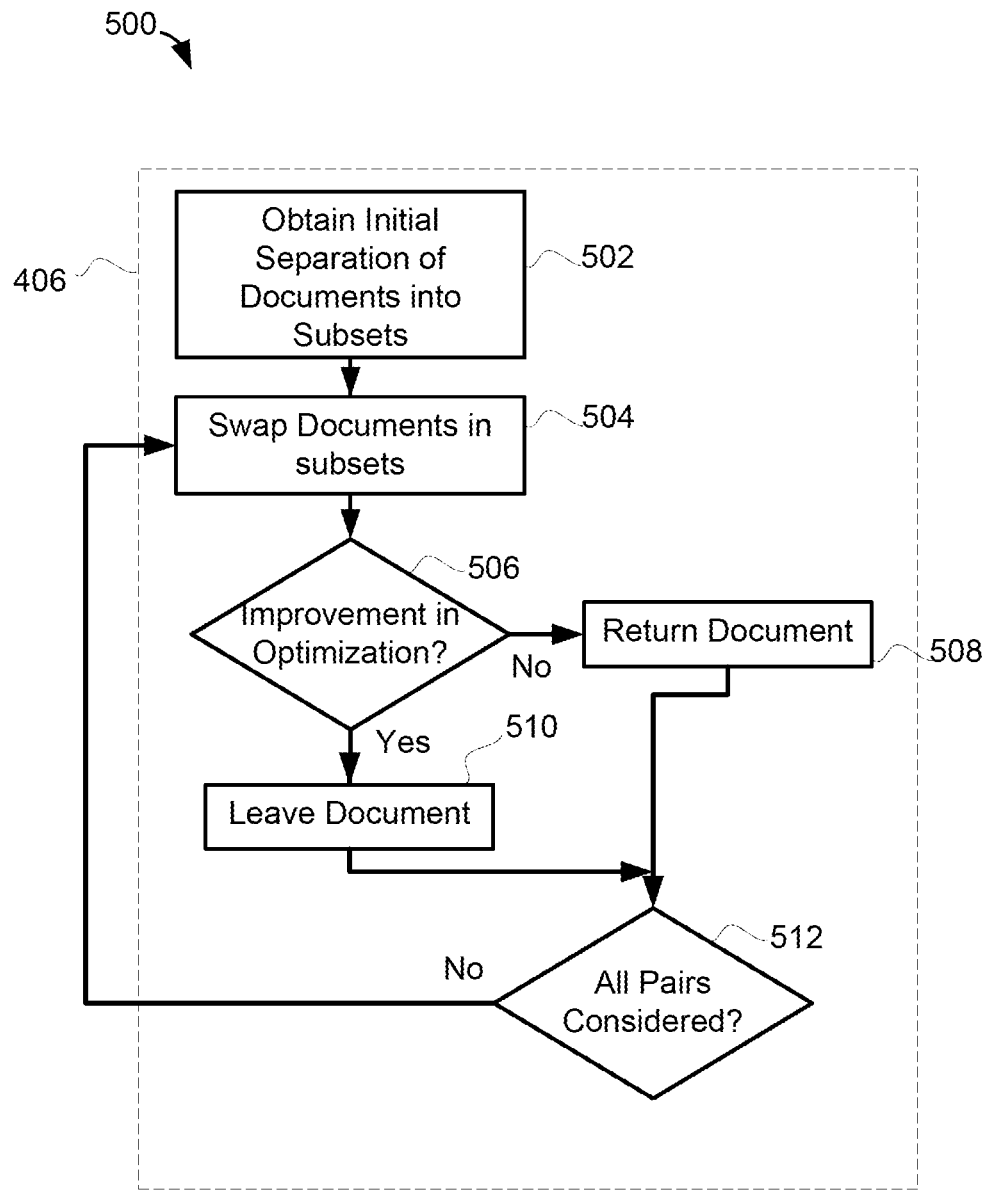
FIG. 5 is a flowchart of a method for separating a set of related documents in accordance with some example embodiments of the present disclosure.

Reference will now be made to FIG. 5, which illustrates a flowchart of a method 500 for separating a set of related documents in accordance with some example embodiments of the present disclosure. The method 500 may, in at least some embodiments, be performed at 406 of FIG. 4.

The method 500 includes steps or operations which may be performed by the document selection system 170. In at least some embodiments, the document selection system 170 may include a memory 250 (or other computer readable storage medium) which stores computer executable instructions which are executable by one or more processor 240 and which, when executed, cause the processor to perform the method 400 or a portion thereof. In at least some embodiments, a document selection module 232 may contain computer executable instructions for causing the processor 240 to perform the method 500 of FIG. 5.

The method 500 may be used to solve an optimization problem such as the optimization problem discussed above with reference to 406 of FIG. 4.

The method 500 performs a local search to identify a separation of documents into two or more subsets of related documents which represents a local optimization of the optimization problem. That is, the method 500 may be used to find a local solution to the optimization problem.

At 502, the method 500 obtains an initial separation of documents into two or more subsets of related documents. In at least some embodiments, the documents are initially separated into two or more subsets based on one or more quality score associated with the documents. That is, the documents in the set of related documents are ranked by one or more quality score (such as the quality scores discussed above with reference to 306 of FIG. 3) and a predetermined number of documents in the set of related documents are selected for inclusion in the first subset of related documents. That is, a predetermined number of the highest ranked documents in the set of related documents are placed in the first subset of related documents 162. In at least some embodiments, all other documents in the set of related documents 160 are placed in the second subset of related documents 164. More particularly, in at least some embodiments, at 502 the document selection system 170 may be configured to place a predetermined number of documents from the set of related documents 160 having higher relative quality scores in the first subset of related documents 162 and to place documents from the set of related documents 160 having lower relative quality scores in a second subset of related documents 164.

After the documents in the set of related documents 160 are initially separated into two or more subsets, the document selection system 170 may iteratively swap the subset membership of a document in the first subset of related documents with a document in the second subset of related documents. More particularly, at 504, the subset membership of a document in the first subset is swapped with a document in the second subset.

At 506, the document selection subsystem 170 determines, based on the optimization problem, whether the swap has improved the optimization of the separation of the documents. That is, the document selection subsystem 170 evaluates an evaluation function associated with the optimization problem and determines whether the current subset membership (i.e. after the swap) is more optimal than the previous subset membership (i.e. before the swap). If the current subset membership is more optimal than the previous subset membership, then the documents are left as swapped (at 510). If, however, the current subset membership is less optimal than the previous subset membership, then the documents are returned to their previous subsets (at 508). That is, the swapped documents are returned back to the subset in which they were included prior to the swap.

At 512, the document selection subsystem 170 determines whether every pair of documents has been, at some point, swapped. If so, then the method 500 ends and operation may resume at 310 of FIG. 3. If, however, every pair of documents has not been considered, then another iteration of the swapping of documents (i.e. for a pair of documents not yet swapped) may begin at 504.

While FIG. 5 illustrates the use of a local search in order to solve the optimization problem, in other embodiments, other methods of solving an optimization problem may be used. For example, in at least some embodiments, an integer linear program (ILP) may be used to describe and solve an optimization problem. An integer linear problem may be more efficient at solving an optimization problem where there are few documents in a set of related documents.

Furthermore, while the above disclosure refers generally to the ranking of documents which are text-based documents, in other embodiments, the systems and methods described herein may be used for other types of documents. For example, the documents may, in various embodiments, include one or more of: audio files, video files, and/or related items which are commonly displayed on media webpages. In at least some such embodiments, prior to performing the methods 300, 400, 500 of FIGS. 3 to 5, at least some audio associated with one or more audio files and/or video files may be converted to text using a voice recognition subsystem. In such embodiments, the converted text may be used in place of its associated document (i.e. in place of the audio or video file) in the methods 300, 400, 500 of FIGS. 3 to 5.

While the present disclosure describes methods, a person of ordinary skill in the art will understand that the present disclosure is also directed to various apparatus, such as a server and/or a document processing system (such as a document selection system 170), including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus and articles of manufacture also come within the scope of the present disclosure.

While the methods 300, 400, 500 of FIGS. 3 to 5 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method of separating a set of related documents, the method comprising:
    determining, on a document selection system, quality scores for a plurality of the documents in the set of related documents based on comparisons with a predetermined value;
    obtaining a similarity score for a plurality of pairs of documents in the set of related document; and
    on the document selection system, obtaining a first subset of related documents which solves an optimization problem, the first subset of related documents being a subset of the set of related documents, the optimization problem being a function of one or more quality scores of the documents assigned to the first subset of related documents and one or more similarity scores of pairs of documents assigned to the first subset of related documents, wherein the optimization problem maximizes an evaluation function and wherein the evaluation function is:

$$f(A) = \sum_{v \in V} u_v(v, A(v)) + \sum_{v_1, v_2 \in E} u_E(v_1, v_2, A(v_1), A(v_2))$$

where v is a document, A(v) is a labelling function which assigns a document, v, to either the first subset of related documents or a second subset of related documents, V is the set of related documents, $u_v(v,A(v))$ is a function of the quality score of a document v, E is a set of all pairs of documents and $u_E(v_1,v_2,A(v_1),A(v_2))$ is a function of the similarity score between document $v_1$ and $v_2$.

2. The method of claim 1, wherein the documents are micro blogs which are related by subject matter.

3. The method of claim 1, wherein the quality score for a document is determined based on the number of words or characters in that document.

4. The method of claim 1, wherein the quality score for a document is determined based on the percentage of words in that document which are listed in a dictionary.

5. The method of claim 1, wherein the quality score for a document is determined based on a language quality of that document.

6. The method of claim 1, wherein the quality score for a document is determined based on a number of subscribers associated with a content producer for that document.

7. The method of claim 1, wherein the quality score for a document is determined based on a number of times the document has been shared.

8. The method of claim 1, wherein the similarity score for a pair of documents is determined based on the number of terms which are common to both documents in the pair.

9. The method of claim 1, wherein the similarity score for a pair of documents is determined from the distance between term-frequency inverse document frequency vector representations of documents.

10. The method of claim 1, wherein, if a document, v, is assigned to the first subset of related documents, then:

$$u_v(v,A(v))=w_q^0 q(v)+w_r^0(1-r(v))+w_o^0 o(v),$$

and if a document is assigned to the second subset of related documents, then:

$$u_v(v,A(v))=w_q^1 q(v)+w_r^1(r(v))+w_o^1 o(v),$$

and if a first document $v_1$ and a second document $v_2$ are assigned to the same subset then:

$$u_E(v_1,v_2,A(v_1),A(v_2))=1-s(v_1,v_2),$$

and if the first document $v_1$ and the second document $v_2$ are assigned to different subsets then:

$$u_E(v_1,v_2,A(v_1),A(v_2))=s(v_1,v_2),$$

where $w_q^0$ is a relevance score weight for documents in the first subset of related documents, $w_q^1$ is a relevance score weight for documents in the second subset of related documents, q(v) is a relevance score, $w_r^0$ is a re-post score weight for documents in the first subset of related documents, $w_r^1$ is a re-post score weight for documents in the second subset of related documents, r(v) is a re-post score, $w_o^0$ is a follower score weight for documents in the first subset of related documents, $w_o^1$ is a follower score weight for documents in the second subset of related documents, o(v) is a follower score and $s(v_1, v_2)$ is a similarity score between the first document and the second document.

11. The method of claim 10, wherein obtaining a first subset of related documents which solves an optimization problem comprises:
    performing a local search to identify a separation of documents into two or more subsets of related documents which represents a local optimization of the optimization problem.

12. The method of claim 11, where performing a local search comprises:
   obtaining an initial separation of documents into the two or more subsets of related documents; and
   iteratively swapping the set membership of a document in the first subset of related documents with a document in a second subset of related documents and determining, based on the optimization problem, whether the swap improves the optimization of the separation of documents and if not, returning the documents which were swapped back to the subset in which they were included prior to the swap.

13. The method of claim 12, wherein obtaining an initial separation of documents into the two or more subsets comprises:
   separating the documents into the two or more subsets based on their quality score.

14. The method of claim 13, wherein separating the documents into the two or more subsets comprises:
   placing a predetermined number of documents having higher relative quality scores in the first subset of related documents and placing documents having lower relative quality scores in a second subset of related documents.

15. The method of claim 1, wherein the optimization problem seeks to minimize the similarity between pairs of documents in the first subset of related documents and to maximize the quality of documents in the first subset of related documents.

16. A document separation system comprising:
   a processor; and
   a memory coupled to the processor, the memory storing processor executable instructions which, when executed by the processor cause the processor to:
   determine quality scores for a plurality of the documents in the set of related documents based on comparisons with a predetermined value;
   obtain a similarity score for a plurality of pairs of documents in the set of related document; and
   obtain a first subset of related documents which solves an optimization problem, the first subset of related documents being a subset of the set of related documents, the optimization problem being a function of one or more quality scores of the documents assigned to the first subset of related documents and one or more similarity scores of pairs of documents assigned to the first subset of related documents, wherein the optimization problem maximizes an evaluation function and wherein the evaluation function is:

$$f(A) = \sum_{v \in V} u_v(v, A(v)) + \sum_{v_1, v_2 \in E} u_E(v_1, v_2, A(v_1), A(v_2))$$

where v is a document, A(v) is a labelling function which assigns a document, v, to either the first subset of related documents or a second subset of related documents, V is the set of related documents, $u_v(v,A(v))$ is a function of the quality score of a document v, E is a set of all pairs of documents and $u_E(v_1,v_1,A(v_1),A(v_2))$ is a function of the similarly score between document $v_1$ and $v_2$.

17. The method of claim 16, wherein the documents are micro blogs which are related by subject matter.

18. The document separation system of claim 16, wherein the processor executable instructions, when executed, cause the processor to determine the quality score for a document based on the number of words or characters in that document.

19. The document separation system of claim 16, wherein the processor executable instructions, when executed, cause the processor to determine the quality score for a document based on the percentage of words in that document which are listed in a dictionary.

20. The document separation system of claim 16, wherein the processor executable instructions, when executed, cause the processor to determine the quality score for a document based on a language quality of that document.

21. The document separation system of claim 16, wherein the processor executable instructions, when executed, cause the processor to determine the quality score for a document based on a number of subscribers associated with a content producer for that document.

22. The document separation system of claim 16, wherein the processor executable instructions, when executed, cause the processor to determine the quality score for a document based on a number of times the document has been shared.

23. The document separation system of claim 16, wherein the processor executable instructions, when executed, cause the processor to determine the similarity score for a pair of documents based on the number of terms which are common to both documents in the pair.

24. The document separation system of claim 16, wherein the processor executable instructions, when executed, cause the processor to determine the similarity score for a pair of documents from the distance between term-frequency inverse document frequency vector representations of documents.

25. The document separation system of claim 16, wherein, if a document, v, is assigned to the first subset of related documents, then:

$$u_v(v,A(v)) = w_q^0 q(v) + w_r^0 (1-r(v)) + w_o^0 o(v),$$

and if a document is assigned to the second subset of related documents, then:

$$u_v(v,A(v)) = w_q^1 q(v) + w_r^1 (r(v)) + w_o^1 o(v),$$

and if a first document $v_1$ and a second document $v_2$ are assigned to the same subset then:

$$u_E(v_1,v_2,A(v_1),A(v_2)) = 1 - s(v_1,v_2),$$

and if the first document $v_1$ and the second document $v_2$ are assigned to different subsets then:

$$u_E(v_1,v_2,A(v_1),A(v_2)) = s(v_1,v_2),$$

where $w_q^0$ is a relevance score weight for documents in the first subset of related documents, $w_q^1$ is a relevance score weight for documents in the second subset of related documents, q(v) is a relevance score, $w_r^0$ is a re-post score weight for documents in the first subset of related documents, $w_r^1$ is a re-post score weight for documents in the second subset of related documents, r(v) is a re-post score, $w_o^0$ is a follower score weight for documents in the first subset of related documents, $w_o^1$ is a follower score weight for documents in the second subset of related documents, o(v) is a follower score and $s(v_1, v_2)$ is a similarity score between the first document and the second document.

26. The document separation system of claim 16, wherein obtaining a first subset of related documents which solves an optimization problem comprises:
   performing a local search to identify a separation of documents into two or more subsets of related documents which represents a local optimization of the optimization problem.

27. The document separation system of claim 26, where performing a local search comprises:
- obtaining an initial separation of documents into the two or more subsets of related documents; and
- iteratively swapping the set membership of a document in the first subset of related documents with a document in a second subset of related documents and determining, based on the optimization problem, whether the swap improves the optimization of the separation of documents and if not, returning the documents which were swapped back to the subset in which they were included prior to the swap.

28. The document separation system of claim 27, wherein obtaining an initial separation of documents into the two or more subsets comprises:
- separating the documents into the two or more subsets based on their quality score.

29. The document separation system of claim 28, wherein separating the documents into the two or more subsets comprises:
- placing a predetermined number of documents having higher relative quality scores in the first subset of related documents and placing documents having lower relative quality scores in a second subset of related documents.

30. The document separation system of claim 16, wherein the optimization problem seeks to minimize the similarity between pairs of documents in the first subset of related documents and to maximize the quality of documents in the first subset of related documents.

* * * * *